May 18, 1948.    F. R. McFARLAND    2,441,712
CONTROL FOR CHANGE SPEED DRIVE MECHANISM
Filed Oct. 28, 1944    2 Sheets-Sheet 2
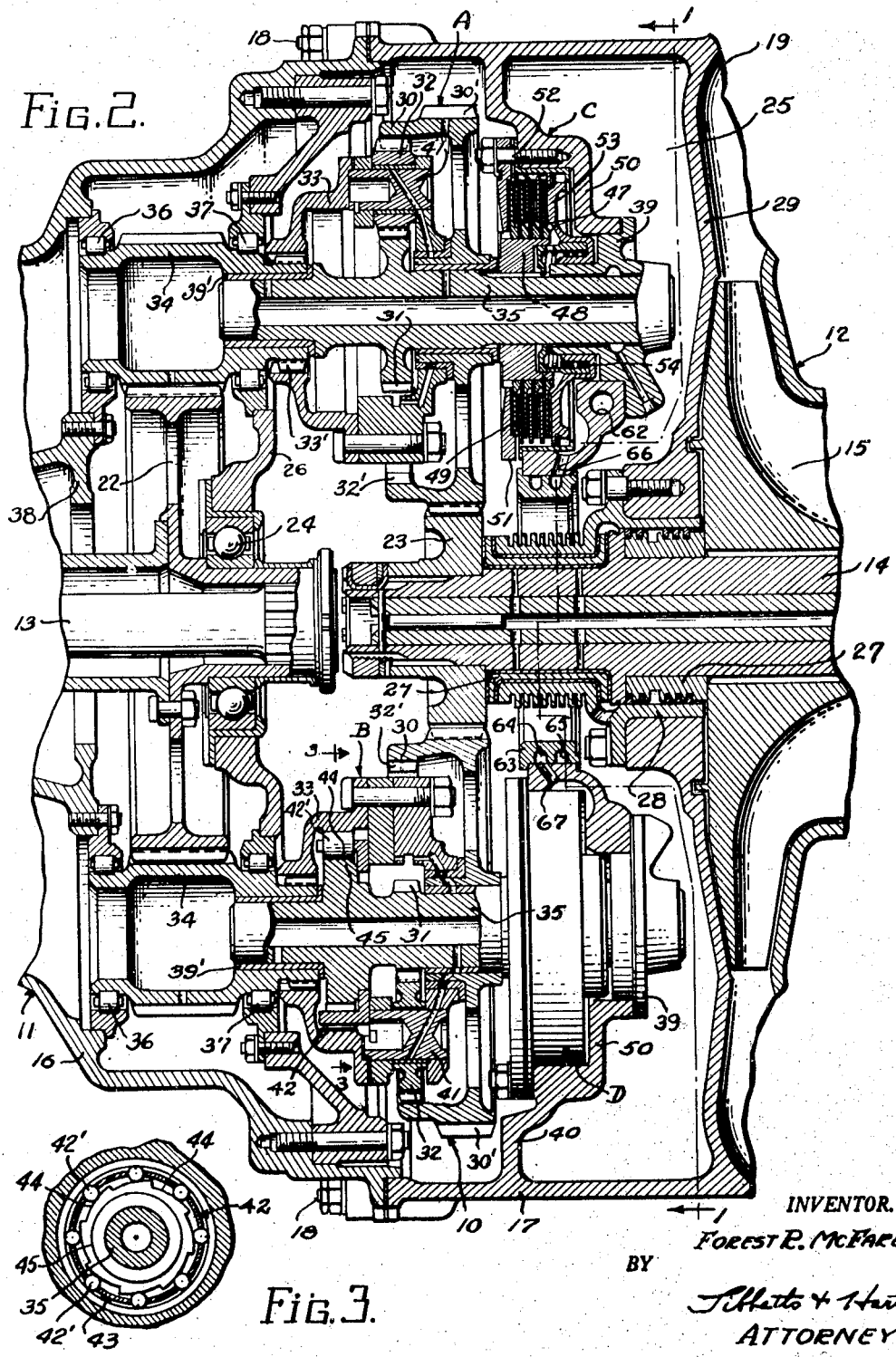
INVENTOR.
FOREST R. McFARLAND
BY
ATTORNEYS Patented May 18, 1948

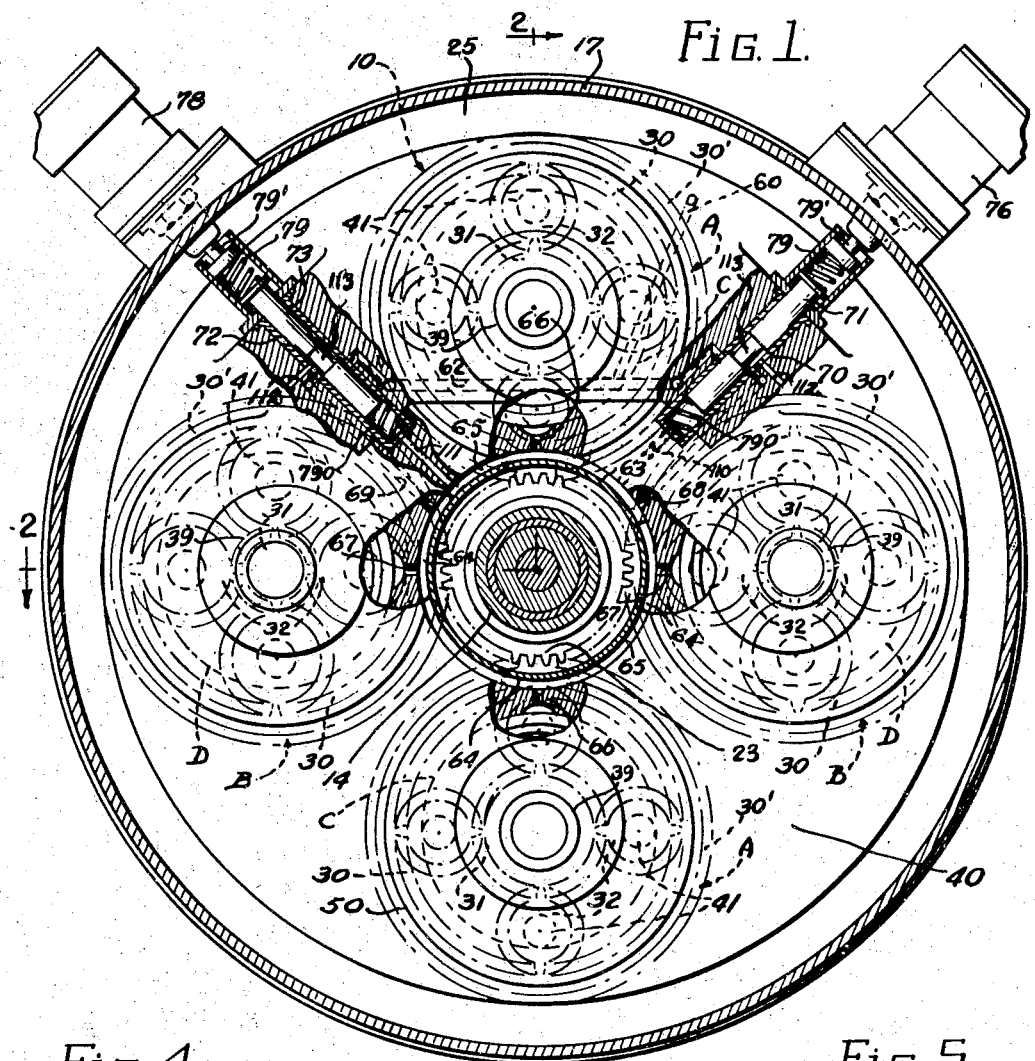

2,441,712

UNITED STATES PATENT OFFICE 2,441,712

CONTROL FOR CHANGE SPEED DRIVE MECHANISM

Forest R. McFarland, Huntington Woods, Mich., assignor to Packard Motor Car Company, Detroit, Mich., a corporation of Michigan Application October 28, 1944, Serial No. 560,796

8 Claims. (Cl. 74—275)

This invention relates to control means for change speed drive mechanism.

An object of the invention is to provide drive mechanism in which three speeds are selectively obtained automatically through two sets of planetary gearing units both connected with driving and driven shafts.

A further object of the invention is to improve the efficiency of an airplane engine by the provision of a supercharger drive mechanism having a plurality of gear ratios selected automatically in accordance with pressure encountered in flight.

Other objects of the invention will appear from the following description taken in connection with the drawings, which form a part of this specification, and in which:

Fig. 1 is a view of a supercharger drive mechanism taken substantially on line 1—1 of Fig. 2;

Fig. 2 is a sectional view of the drive mechanism taken on line 2—2 of Fig. 1;

Fig. 3 is a reduced sectional view taken on line 3—3 of Fig. 2 showing the overrunning clutch;

Fig. 4 is a diagrammatic view of the control means for the hydraulically actuated speed selecting brake mechanisms;

Fig. 5 is a reduced side elevational view of an engine incorporating the invention.

In the drawings, 10 indicates generally change speed mechanism that may be utilized as a drive for various purposes. In the illustrated embodiment, the mechanism is used as the drive between an internal combustion engine 11 and a supercharger device 12.

In Fig. 2, the drive shaft 13 is the engine crankshaft, or an extension thereof, and the driven shaft 14 has the supercharger impeller 15 fixed thereto. The change speed gearing is arranged between the drive and driven shafts and is housed in a chamber 25 formed by a section of engine casing 16 and a section of the supercharger casing 17, these casing sections being secured together by bolts 18. The outlet end 19 of the supercharger casing is connected by conduit 20 with the engine intake manifold 21 and fuel is supplied to the supercharger by conventional means (not shown).

Shafts 13 and 14 are arranged in axial alignment with their adjacent ends in chamber 25 and gears 22 and 23 are fixed thereto respectively. Drive gear 22 is supported by ball bearing 24 mounted in end wall 26 of the engine casing and the driven shaft is mounted in plain bearings 27 carried by a supporting ring member 28 fixed to wall 29 extending transversely in the supercharger casing.

The change speed gearing connecting the drive and driven shafts comprises sets of planetary gearing A and B. Each gearing set preferably includes two units and the units of the sets are arranged alternately in a circle around the drive and driven gears in chamber 25 so that a unit of each set is mounted substantially opposite the other unit of the same set to provide balanced drives as will hereinafter appear. Each unit includes a ring gear 30 having internal teeth 32', a sun gear 31, and planetary gears 32 mounted on a carrier 33. The carriers are arranged to be driven from the drive shaft 13 by means of the gear 22, a gear 34, shown as a hollow gear, meshing with gear 22, and a splined connection 33' between said gear 34 and the carrier 33. The ring gear 30 is extended to form an external gear 30' which meshes with the gear 23 on the driven shaft 14. The hollow gears are carried by roller bearings 36 and 37, bearings 37 being mounted in wall 26 and bearings 36 being mounted in wall 38 of the engine casing section 16. Sun gear shafts 35 are supported by bearings 39 in wall 40 forming part of the casing 17 and by bearings 39' in gears 34. The planet gears are rotatably mounted on stub shafts 41 on the carriers.

As indicated above, the two planetary gearing units A are mounted opposite each other so that when those units are doing the driving the gears 30' and the gears 34 will be balanced on opposite sides of the axis of the driving and driven shafts. Also, having several units in each set permits of the use of smaller gears in the units as the drive is divided amongst the units. For purposes of description, however, a single A unit only may be referred to at times. The same thing is true of planetary gearing units B. These are opposite each other and when driving provide a balanced drive.

The planetary gearing units A and B differ from each other in two respects, first, in that the gear ratio is different. Thus it will be noted that the gear 31 of the unit A is larger than the gear 31 of the unit B, and in consequence thereof when the shaft 35 of unit A is held against rotation, as will hereinafter appear, the ring gear 30 will be rotated at a higher speed, and consequently the driven shaft 14 will be driven at a higher speed than is the case when unit B with its smaller planetary gear 31 is doing the driving. Second, the units A and B differ from each other in that in unit B there is a one-way clutch 42 between the carrier 33 and the sun gear shaft 35. The rollers 42' of this one-way clutch bear against the annular surface 43 on the carrier and against the inclined surfaces 44 on flange 45 on the sun gear shaft (see Fig. 3). Thus, as pointed out above, the gear ratio in the sets is arranged so that unit A will increase the driving speed from shaft 13 to shaft 14 to a greater extent than the gearing in unit B. Thus unit A, when conditioned to drive, will provide high speed overdrive. Unit B will provide low and intermediate speed overdrive from shaft 13 to shaft 14, the low speed overdrive being effective when the sun gear is free and the one-way clutch 42 couples the carrier 33 to the shaft 35 and causes the ring gear 30 to rotate at the same speed as the carrier and as the gear 34. Gears 34 will be driven approximately three times the speed of the crankshaft which will be the low speed drive for the ring gear 30. Then there is of course the second step-up of about one-to-two from ring gear 30 to driven shaft 14 through gears 30' and 23. When sun gear shaft 35 of unit B is held against rotation the carrier 33 will overrun shaft 35 and the planetary gears 32 will run around gear 31 and cause ring gear 30 to be rotated faster than carrier 33 but not as fast as in the case of unit A with its larger sun gear 31. Thus the intermediate speed of the ring gear 30 and consequently the driven shaft 14, is obtained.

In order to condition units A for driving, the sun gears of these planetary gearings are held stationary by brake mechanisms C, and similar brake mechanisms D are provided to hold the sun gear shafts in units B stationary when intermediate driving speed is desired. The brake mechanisms C or D are applied to select high or intermediate overdrive speed and when they are disengaged, low speed drive will be established through the one-way clutches 42 in units B.

Brake plates 47 are slidably splined to ring members 48 fixed to the sun gear shafts and plates 49 alternating with plates 47 are splined to annular housings 50 formed integral with casing wall 40. A backing member 51 is secured by bolts 52 to each housing and each housing contains a pressure ring or piston member 53. The pressure ring members are actuated to clamp or release the brake plates. Spring 54 in the housings act against the ring members to normally release the brake plates and a fluid system is connected to move the ring members in a direction for engaging the plates.

When brake mechanisms C are made effective the sun gears in the planetary gearing units A are held stationary causing them to drive shaft 14 at the highest speed. When brake mechanisms C are engaged, brake mechanisms D will be released and the gearing units B will idle. When brake mechanisms D are engaged the sun gears in gearing units B will be held stationary and the drive will be at an intermediate speed. In intermediate speed relation, units A will idle and the one-way clutch rollers 42 will freewheel. When brake mechanisms C and D are released, the gearing units A and B will idle and the carriers and sun gears in units B will be locked up, or be wedged together by the one-way clutches 42 thus providing a direct drive through such gearing units from gears 34.

In order to obtain the best engine performance when the driven shaft is utilized to drive a supercharger impeller associated with an airplane engine, the drive through the gearing is selected automatically to obtain the necessary air charges in the fuel mixture in accordance with atmospheric pressure. The brake mechanisms are preferably engaged by a hydraulic system under the control of an electric system governed by air pressure.

The fluid in the engine pressure lubricating system may be utilized to engage the brakes and a conduit 60 (Figs. 1 and 5) leads from the engine operated oil pump 61 to a distributing passage 62 in wall 40. This wall is provided with a central opening bounded by housings 50 and a manifold ring 63 is fitted in the opening. The ring has two separated annular peripheral grooves 64 and 65, groove 64 communicating with passages 67 leading to the interior of the housings of brake mechanisms D and groove 65 communicating with passages 66 leading to the interior of the housings of brake mechanisms C. Passage 68 leads from the distributing passage 62 to groove 65 and passage 69 leads from passage 62 to groove 64. Valve housing 70 is connected in passage 68 and carries a flow control valve 71 and valve housing 72 is connected in passage 69 and carries a flow control valve 73. These valves are actuated by an electric system under the control of an aneroid.

Valve 71 is connected to be actuated by solenoid 76 and valve 73 is connected to be actuated by solenoid 78. The solenoids may be of conventional design and are suitably secured on the outside of the casing 17. The armatures 79' of the solenoids bear against springs 79 which in turn bear against the valve stems. Springs 790 urge the valves outwardly to shut off oil flow through the valve housings and the solenoids are energized to push the valves inwardly so that oil can flow through the valve housings. Solenoid 76 is energized to move valve 71 so that oil will flow to brake mechanisms C and solenoid 78 is energized so that oil will flow to brake mechanisms D. Oil flow into the brake housings will force the pressure members in a direction to engage the brake plates so that the associated sun gear counter shafts will be held stationary.

In the event the brakes in the sets of units A and B should be engaged at the same time, two differing gear ratios would become effective with consequent damage to the gearing so provision is made to prevent such a possibility. Passage 110 in wall 40 connects the bottom portion of valve housing 70 with the groove 64 and a similar passage 111 connects the bottom portion of valve housing 72 with groove 65. By means of these passage connections fluid under pressure will flow to the bottom of the closed valve housing when the other valve housing is open to fluid flow. The fluid pressure and the pressure of spring 790 in the closed valve housing together provide a sufficient force to prevent the solenoid from opening the closed valve and the arrangement is such that when fluid pressure is relieved in the closed valve housing by closing the open valve housing then the solenoid will have sufficient force to overcome the pressure of spring 790 so that the valve will be moved to open position. The flexible actuator springs 79 between the armatures and the valve stems will become compressed when the solenoids are energized and thus the valve is cocked and will be moved into open position by such compressed springs upon the relief of pressure in the bottom portion of the housing. Thus, neither valve 71 nor valve 73 can be opened while the other valve is open and consequently, the brakes in gearing units A can be engaged only when the brakes in gearing units B are disengaged, and vice versa. As a further means for preventing both sets of gearing from operating at the same time, vent passages 112 are formed in wall 40 and are located so that the reduced diameter portion 113 of valves 71 and 73 will connect them with passages 68 and 69 when passage 62 is cut off. When either valve is moved to open passage 62 to passages 68 or 69 the adjacent vent passage will first be shut off. Thus, pressure in the brake housings is relieved except when the associated valve opens the passage 62 to apply the brakes and there can be no fluid drag tending to cause rotation of the two sets of gearing at the same time.

The aneroid control mechanism is shown somewhat diagrammatically in Fig. 4. Solenoid 78 has a wire 80 connected with a pivoted switch arm 81 and solenoid 76 has a wire 82 connected with contact 83. Switch arm 84 is pivoted in parallel relation with arm 81 and is connected by wire 85 with battery 86. The parallel switch arms are of the over center type and springs 87 connect them with an anchor bar 88 mounted on the free end of a lever 89. The lower arm of bar 88 is shorter than the upper arm so that as the bar is moved downwardly the spring 87 will reverse the position of the switch arm 84 before the other spring 87 will reverse the position of the switch arm 81. The lever 89 is pivoted to a stem 90 extending from the movable upper wall of aneroid 91 and to a stationary bracket 92 extending from the aneroid support 93. Spring 94 is connected with the aneroid stem and the bracket in a relation opposing expansion of the aneroid.

When the aneroid is expanded due to a predetermined low air pressure such as is encountered in the higher altitudes, arm 89 and bar 88 will be moved upwardly from the intermediate position in which they are shown in Fig. 4, and the upper spring 87 will snap the switch arm upwardly over dead center to the position shown in dotted lines. This will cause contact 95 on arm 84 to engage contact 83 forming the circuit from the battery to solenoid 76 which will cause the solenoid 76 to move the valve 71 inwardly allowing the oil to flow through passage 65 and into the housing of brakes C so that said brakes will thereby hold sun gears 31 of the planetary gear units A stationary, thus producing the high speed overdrive of the impeller of the supercharger. At the same time the engagement of contact 95 with contact 96 will be broken and even though contacts 97 and 96 are engaged there will be no flow of current to solenoid 78 and therefore the gearing units B will run idle.

At some predetermined air pressure encountered at an elevation below that just referred to, the aneroid will be contracted to some extent and the lever 89 and bar 88 will assume the intermediate position in which they are shown in Fig. 4. This will cause the upper spring 87 to snap the switch arm 84 away from contact 83 and cause contact 95 to engage contact 96, but this movement will not be sufficient to change the position of switch arm 81 so that contacts 96 and 97 will continue to be engaged. This movement of switch arm 84 completes the circuit to solenoid 78 and causes the sun gears in gearing units B to be held stationary and thereby drive the supercharger at an intermediate speed. At the same time the circuit to solenoid 76 will have been broken at 83 and the gearing units A will run idle.

As the aneroid is still further contracted by increased air pressure at an altitude below that last referred to, the lever 89 will be dropped still farther and the spring 87 will cause the switch arm 81 to snap away from contact 96 and rest against the abutment 100, where it is shown in dotted lines in Fig. 4. This will break the circuit to solenoid 78 and now both solenoids are de-energized and neither of the planetary gearings will operate as such. However, the one-way clutch 42 of units B will form a driving connection through the planetaries thus providing a low speed drive to the impeller of the supercharger.

Tracing the circuits, in high speed drive the circuit between battery 86 and solenoid 76 comprises wire 85, switch arm 84, contacts 95 and 83 and wire 82. In intermediate speed drive the circuit between the battery 86 and solenoid 78 comprises wire 85, switch arm 84, contact 95, contact member 96, contact 97, switch arm 81 and wire 80. In low speed drive the circuits to both solenoids will be open.

With the mechanism herein described, the supercharger impeller will be driven at one of three speeds automatically selected in accordance with atmospheric pressure so that the necessary fuel will be supplied to an airplane engine to obtain efficient performance at varying elevations.

It will be understood that various forms of the invention other than that described above may be used without departing from the spirit or scope of the invention.

What is claimed is:

1. In a change speed drive mechanism having two shafts connected by two planetary gearing units of different gear ratio, control mechanism for selecting the drive through the units comprising a brake for each unit engageable to hold an element thereof to establish drive therethrough, a pressure fluid system connected to engage the brakes, a pair of valves operable to selectively control fluid flow to the brakes, and means connecting the system at the outlet side of each valve with the other valve whereby the fluid released by either valve when open will prevent opening of the other valve.

2. In change speed drive mechanism, a casing, a drive shaft, a driven shaft, said shafts projecting into said casing in aligned relation, a pair of oppositely disposed planetary gearing units of high gear ratio geared to the shafts, a pair of oppositely disposed planetary gearing units of lower gear ratio geared to the shafts in alternating relation with the high ratio units, said units being arranged in a circle around the axes of the shafts, brake means for holding an element of the planetary gearing units stationary with the casing to selectively condition the pairs of units for driving, said brake means being housed in chambers arranged in a circle in a portion of the casing, said portion of the casing having parallel circular passages connected one with the housings for one pair of brake means and the other with the housings for the other pair of brake means, a fluid pressure system connected by passages in the casing with the circular passages, normally closed valves in the passages connected with the circular passages, a passage leading from each circular passage to the valve in the passage leading to the other circular passage whereby pressure of the fluid in either circular passage will prevent opening of the valve in the passage leading to the other circular passage, and means for selectively opening said valves when the pressure acting thereagainst permits.

3. In an aircraft supercharger change speed drive gearing having a normally engaged low gear speed and selective fluid operated selector means for two higher speeds, control means comprising a pair of normally closed valves controlling fluid flow to the selector means, solenoids having armatures connected to open the valves when energized, electric circuit means connected with the solenoids, switch means operable to selectively control current flow to the solenoids and to open the circuit means to both solenoids, and an aneroid for actuating said switch means.

4. In an aircraft change speed drive gearing having a pair of speed selector means operated by fluid pressure, control mechanism comprising a pair of normally closed valves controlling fluid flow to the selector means, solenoids having armatures connected to open the valves, a movable switch, a source of electric energy connected with a movable switch, conductor means including a contact engageable by the switch connected with one solenoid, a second switch movable in parallel with said movable switch, a conductor connecting the second switch with the other solenoid, a contact between and spaced from the other two contacts, and aneroid responsive means for actuating said switches in parallel relation, said movable switch establishing the circuit to one solenoid when moved away from the intermediate contact and establishing the circuit to the other solenoid when both switches engage the intermediate contact.

5. In an aircraft change speed drive gearing having a pair of speed selector means operated by fluid pressure, control mechanism comprising a pair of normally closed valves controlling fluid flow to the selector means, solenoids having armatures connected to open the valves, conductor means connected with each solenoid, spaced contacts one of which is connected with one of the conductors, a switch arm movable between the contacts, a source of electric energy connected with said switch arm, another switch arm connected with the other conductor and engageable with a contact spaced from the conductor contact, means for operating said switch arms, and an aneroid for actuating the operating means for said switch arms.

6. In an aircraft change speed drive gearing having three selective gear ratios one of which is normally effective and the other two of which are made effective by fluid pressure operated brake means, control mechanism comprising normally closed valves controlling fluid application of said brake means, solenoids for selectively opening the valves, electric circuit means including switch means controlling said solenoids, an aneroid, and switch operating means actuated by said aneroid, said switch means being moved to ineffective position at high atmospheric pressure and to effective positions at preselected lower atmospheric pressure to speed up the drive as atmospheric pressure is reduced.

7. In change speed drive mechanism having two shafts connected by two planetary gearing units of different gear ratio each having a sun gear, control mechanism for selectively holding one of the sun gears to establish the drive through its associated planetary unit comprising a brake for each sun gear, and a fluid pressure system operable to selectively apply one of the brakes and to directly prevent application of the other of said brakes while said one brake is applied.

8. In change speed gearing for an aircraft supercharger having a pair of selectively operated means for establishing two driving speeds through the gearing, a fluid pressure system connected to operate said selectively operated means, control mechanism in the fluid system comprising a pair of valves controlling fluid flow to the selectively operated means, solenoids having armatures connected to the valves, electric circuits connected with the solenoids, switch means operable to selectively open or close said circuits, and an aneroid controlling operation of said switch means.

FOREST R. McFARLAND.

REFERENCES CITED

The following references are of record in the file of this patent:

UNITED STATES PATENTS

| Number | Name | Date |
|---|---|---|
| 1,954,436 | Waseige | Apr. 10, 1934 |
| 2,263,453 | Browne | Nov. 18, 1941 |
| 2,283,284 | Owner | May 19, 1942 |
| 2,314,286 | Olcott | Mar. 16, 1943 |
| 2,354,047 | Owner | July 18, 1944 |
| 2,374,305 | Paton | Apr. 24, 1945 |